United States Patent
Izumi et al.

(10) Patent No.: US 11,568,108 B2
(45) Date of Patent: Jan. 31, 2023

(54) COMBINATORIAL SOLUTION DETERMINATION SYSTEM

(71) Applicant: DAIKIN INDUSTRIES, LTD., Osaka (JP)

(72) Inventors: Yuuta Izumi, Osaka (JP); Tadafumi Nishimura, Osaka (JP); Hiroshi Morita, Suita (JP); Haruki Inoue, Suita (JP)

(73) Assignee: Daikin Industries, Ltd., Osaka (JP)

(*) Notice: Subject to any disclaimer, the term of this patent is extended or adjusted under 35 U.S.C. 154(b) by 0 days.

(21) Appl. No.: 17/623,167

(22) PCT Filed: Jul. 3, 2020

(86) PCT No.: PCT/JP2020/026247
§ 371 (c)(1),
(2) Date: Dec. 27, 2021

(87) PCT Pub. No.: WO2021/002464
PCT Pub. Date: Jan. 7, 2021

(65) Prior Publication Data
US 2022/0253572 A1 Aug. 11, 2022

(30) Foreign Application Priority Data
Jul. 4, 2019 (JP) .............................. JP2019-125449

(51) Int. Cl.
*G06F 30/20* (2020.01)
*G06F 111/10* (2020.01)

(52) U.S. Cl.
CPC .......... *G06F 30/20* (2020.01); *G06F 2111/10* (2020.01)

(58) Field of Classification Search
CPC .............................. G06F 30/20; G06F 2111/10
See application file for complete search history.

(56) References Cited

U.S. PATENT DOCUMENTS

| | | | | |
|---|---|---|---|---|
| 2005/0097559 A1* | 5/2005 | He | ...................... | H04L 67/1001 718/104 |
| 2007/0010901 A1* | 1/2007 | Fukui | ..................... | G06Q 10/04 700/74 |
| 2007/0087756 A1* | 4/2007 | Hoffberg | .............. | G06Q 20/065 455/450 |

FOREIGN PATENT DOCUMENTS

| | | |
|---|---|---|
| JP | 2006-48475 A | 2/2006 |
| JP | 2009-14300 A | 1/2009 |
| JP | 2010-33349 A | 2/2010 |

OTHER PUBLICATIONS

Li L, Zhou L, Yang C, Xiong R, You S, Han Z. A novel combinatorial optimization algorithm for energy management strategy of plug-in hybrid electric vehicle. Journal of the Franklin Institute. Oct. 1, 2017;354(15):6588-609. (Year: 2017).*

(Continued)

*Primary Examiner* — Chuen-Meei Gan
(74) *Attorney, Agent, or Firm* — Global IP Counselors, LLP

(57) ABSTRACT

A combinatorial solution determination system includes a candidate solution generation unit that generates candidate combinatorial solutions, a simulation unit, an evaluation index calculation unit, a solution determination unit, and a necessary-series-data extraction unit. The simulation unit calculates simulation data using information related to the candidate combinatorial solutions, and series data to evaluate a combinatorial solution. The evaluation index calculation unit calculates evaluation indices based on the simulation data. The solution determination unit determines a combinatorial solution having high evaluation from the candidate combinatorial solutions based on the evaluation indices each calculated by the evaluation index calculation unit from a corresponding one of the candidate combinatorial solutions. The necessary-series-data extraction unit (Continued)

extracts second and third series data from the first series data, and combines the second and third series data and acquire the second and third series data as necessary series data.

11 Claims, 8 Drawing Sheets

(56) References Cited

OTHER PUBLICATIONS

International Search Report of corresponding PCT Application No. PCT/JP2020/026247 dated Oct. 6, 2020.
Haruki Inoue et al.; "Optimal planning of air-conditioner configuration by local search method" Osaka University, Japan; May 16, 2018.
International Preliminary Report of corresponding PCT Application No. PCT/JP2020/026247 dated Jan. 13, 2022.

\* cited by examiner

COMBINATORIAL SOLUTION DETERMINATION SYSTEM

CROSS-REFERENCE TO RELATED APPLICATIONS

This U.S. National stage application claims priority under 35 U.S.C. § 119(a) to Japanese Patent Application No. 2019-125449, filed in Japan on Jul. 4, 2019, the entire contents of which are hereby incorporated herein by reference.

BACKGROUND

Field of The Invention
Combinatorial solution determination system
Background Information
In the related art, as disclosed in Japanese Unexamined Patent Application Publication No. 2006-48475, a method for formulating various real problems as mathematical programming problems has been used to utilize resources to the maximum.

SUMMARY

If a mathematical programming problem is a black-box optimization problem in which an objective function cannot be formulated, there is an issue that a large amount of computation time is required to derive an optimal solution.

A combinatorial solution determination system according to a first aspect includes a candidate solution generation unit, a simulation unit, an evaluation index calculation unit, a solution determination unit, and a necessary-series-data extraction unit. The candidate solution generation unit generates candidate combinatorial solutions. The simulation unit calculates simulation data using information related to the candidate combinatorial solutions generated by the candidate solution generation unit; and series data for evaluating a combinatorial solution. The evaluation index calculation unit calculates evaluation indices based on the simulation data. The solution determination unit determines a combinatorial solution having high evaluation from among the plurality of candidate combinatorial solutions based on the evaluation indices each calculated by the evaluation index calculation unit from a corresponding one of the plurality of candidate combinatorial solutions. The necessary-series-data extraction unit extracts, based on the evaluation indices calculated by the evaluation index calculation unit from information related to m (m≥2) candidate combinatorial solutions among n (n≥2) candidate combinatorial solutions generated by the candidate solution generation unit; and first series data used as the series data, second series data from within the first series data, the second series data being series data required for calculating the evaluation indices with predetermined accuracy. The necessary-series-data extraction unit extracts, from within the first series data, third series data required for verifying suitability of a predetermined constraint condition for the m candidate combinatorial solutions. The necessary-series-data extraction unit combines the second series data and the third series data to acquire necessary series data. After the necessary-series-data extraction unit extracts the necessary series data, the simulation unit calculates the simulation data using at least information related to a candidate combinatorial solution other than the m candidate combinatorial solutions among the n candidate combinatorial solutions; and series data including the necessary series data.

The combinatorial solution determination system according to the first aspect can efficiently derive the solution of a black-box optimization problem.

A combinatorial solution determination system according to a second aspect is the combinatorial solution determination system according to the first aspect, in which the necessary-series-data extraction unit extracts, as the third series data, the first series data that is less likely to satisfy the predetermined constraint condition.

The combinatorial solution determination system according to the second aspect can efficiently derive the solution of a black-box optimization problem.

A combinatorial solution determination system according to a third aspect is the combinatorial solution determination system according to the first aspect or the second aspect, in which the necessary-series-data extraction unit extracts the second series data by sparse estimation, and extracts the third series data by extreme value statistics.

The combinatorial solution determination system according to the third aspect can efficiently derive the solution of a black-box optimization problem.

A combinatorial solution determination system according to a fourth aspect is the combinatorial solution determination system according to any one of the first to third aspects, in which the necessary-series-data extraction unit eliminates data unnecessary for calculating the evaluation indices with the predetermined accuracy; and data unnecessary when the predetermined constraint condition is taken into account, from the first series data to acquire the necessary series data.

The combinatorial solution determination system according to the fourth aspect can efficiently derive the solution of a black-box optimization problem.

A combinatorial solution determination system according to a fifth aspect is the combinatorial solution determination system according to any one of the first to fourth aspects, in which the combinatorial solution is a combinatorial solution for a product or a combinatorial solution for a method.

The combinatorial solution determination system according to the fifth aspect can efficiently derive the solution of a black-box optimization problem.

A combinatorial solution determination system according to a sixth aspect is the combinatorial solution determination system according to any one of the first to fifth aspects, in which the combinatorial solution is configured to improve an environmental condition of an application target of the combinatorial solution, and the first series data is previous data that is related to the environmental condition of the application target of the combinatorial solution and that affects improvement of the environmental condition.

The combinatorial solution determination system according to the sixth aspect can efficiently derive the solution of a black-box optimization problem.

DETAILED DESCRIPTION OF EMBODIMENT(S)

A combinatorial solution determination system according to an embodiment will be described with reference to the drawings. The combinatorial solution determination system determines the solution of a mathematical programming problem for deriving an air conditioning system having minimum power consumption.

(1) Configuration of Air Conditioning System

Figure 1:
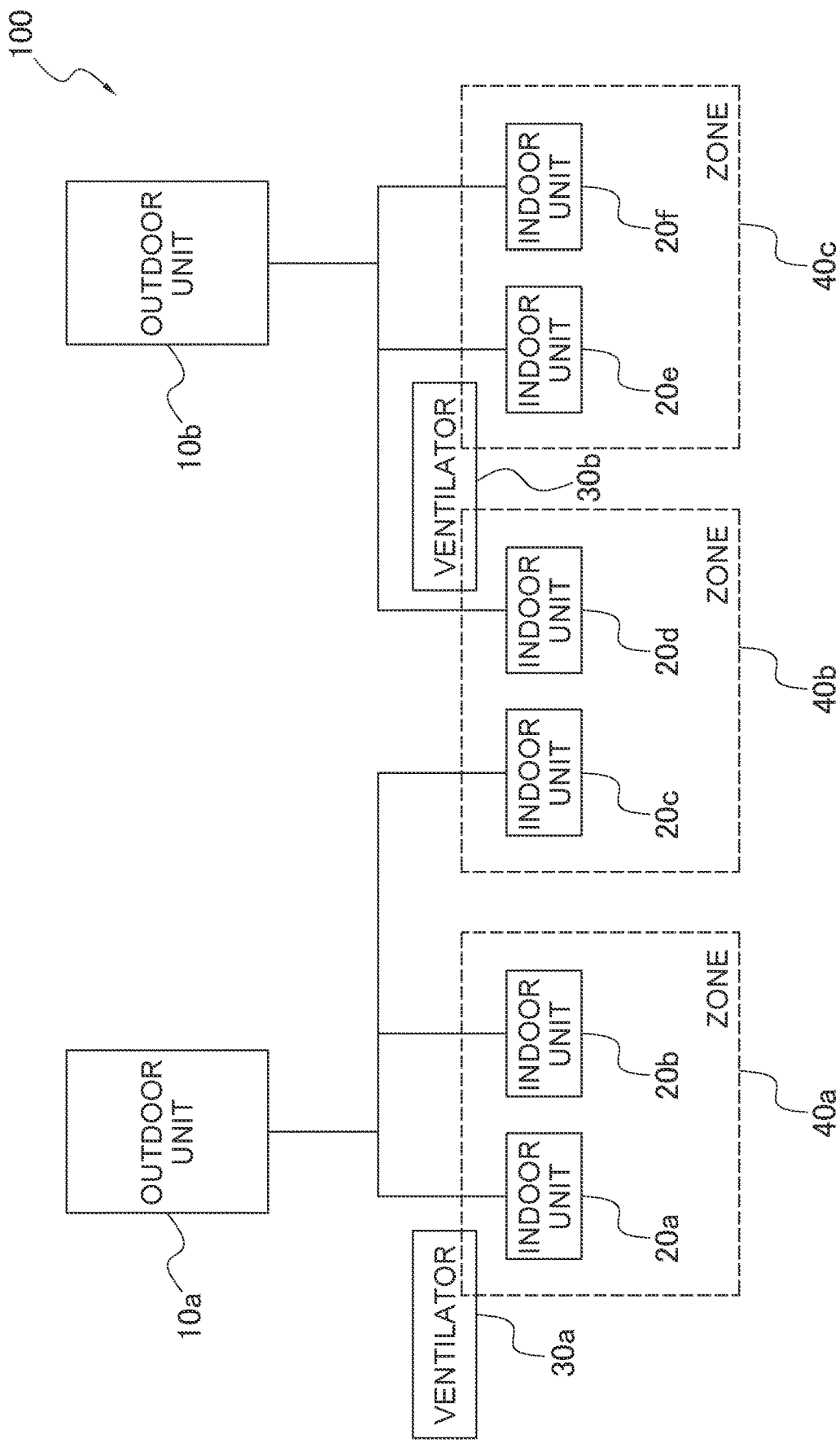
FIG. 1 is a diagram illustrating an example configuration of an air conditioning system 100.

An air conditioning system is installed in a building and mainly includes an outdoor unit, an indoor unit, and a ventilator. FIG. 1 is a diagram illustrating an example configuration of an air conditioning system 100. In FIG. 1, the air conditioning system 100 includes two outdoor units 10a and 10b, six indoor units 20a to 20f, and two ventilators 30a and 30b. Each of the outdoor units 10a and 10b is connected to one or more of the indoor units 20a to 20f via a refrigerant pipe. Each of the indoor units 20a to 20f is connected to any one of the two outdoor units 10a and 10b and is installed in any one of zones 40a to 40c of the building in which the air conditioning system 100 is installed. In FIG. 1, each of the outdoor units 10a and 10b is connected to three of the indoor units 20a to 20f, and two of the indoor units 20a to 20f are installed in each of the zones 40a to 40c. The zones 40a to 40c are spaces to be air conditioned by the air conditioning system 100. The indoor units 20a to 20f remove sensible heat of the zones 40a to 40c to maintain the zones 40a to 40c in a comfortable state. Each of the ventilators 30a and 30b ventilates one or more of the zones 40a to 40c to maintain the zones 40a to 40c in a comfortable state.

(2) Selection of Air Conditioning System

Before the air conditioning system 100 is installed in a building, selection of the air conditioning system 100 needs to be performed. The selection of the air conditioning system 100 is to select devices (the outdoor units 10a and 10b, the indoor units 20a to 20f, and the ventilators 30a and 30b) or determine a combination of devices in consideration of heat loads in the zones 40a to 40c, power consumption, and the like. Parameters (air-conditioning selection parameters) determined in the selection of the air conditioning system 100 are, for example, the number of indoor units 20a to 20f in each of the zones 40a to 40c, the model and performance (such as capacity) of the indoor units 20a to 20f, the model and performance (such as capacity) of the outdoor units 10a and 10b, the model and performance (such as the amount of ventilation) of the ventilators 30a and 30b, a refrigerant system, control parameters, and so on. The refrigerant system is, for example, information related to sets of the outdoor units 10a and 10b and the indoor units 20a to 20f connected to the outdoor units 10a and 10b. The control parameters are, for example, set temperatures and set humidities of the zones 40a to 40c.

In existing selection of an air conditioning system, devices having excessive performance are selected to support a heat load at a peak time. However, only static heat load computation using a temperature as a fixed value is performed, and there is a variation of devices to be selected according to the experience and skill of a person in charge at a site. Thus, there is an issue that devices not appropriate in terms of power consumption may be selected. To address this issue, it is necessary to select an air conditioning system in consideration of characteristics of devices and a building and changes in the temperature and sensible heat of a space to be air conditioned. In this case, however, the computational cost of the heat load and the power consumption increases. In the selection of an air conditioning system, furthermore, the amount of computation time required for selection increases as the number and types of devices increase.

The combinatorial solution determination system according to the embodiment addresses the issue described above and efficiently selects an air conditioning system having minimum power consumption from among a large number of options. Accordingly, the combinatorial solution determination system can select an air conditioning system for which the total cost is minimized. The total cost is the sum of the device cost and the electricity cost. The device cost includes, for example, the cost of devices, the cost of installation work for the devices, and the cost of maintenance of the devices. The electricity cost includes electricity rates required for operating the air conditioning system and is calculated from the power consumption or the like of the devices.

A mathematical programming problem whose solution is determined by the combinatorial solution determination system according to the embodiment is a black-box optimization problem in which an objective function cannot be formulated and thus no general-purpose solver can be used. To determine the solution of a black-box optimization problem, typically, the value of the objective function needs to be computed by simulation, which is likely to increase the computational cost. For example, in the case of a problem of selecting an air conditioning system having minimum power consumption, it is necessary to compute values of power consumption at a large number of times by using simulation software, which is likely to increase the amount of computation time. The combinatorial solution determination system according to the embodiment can reduce the amount of computation time by using an iterated local search method, which is an application of the local search method available also for a black-box optimization problem.

(3) Configuration of Combinatorial Solution Determination System

Figure 2:
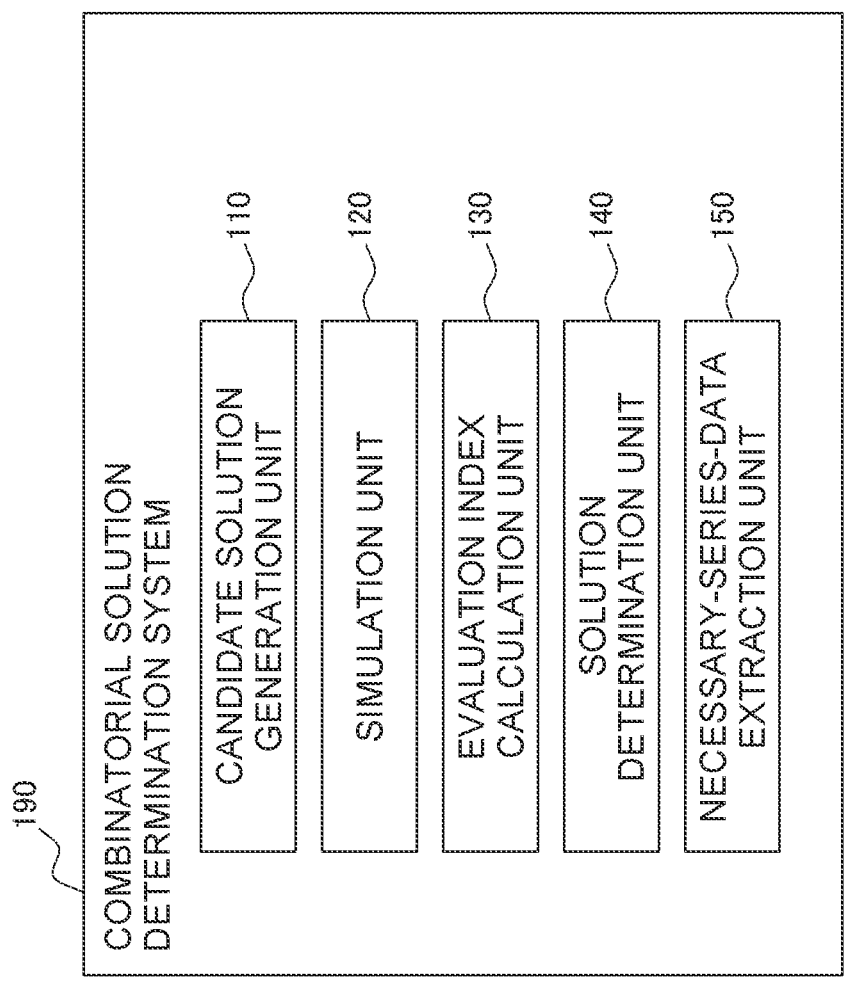
FIG. 2 is a schematic block diagram of a combinatorial solution determination system 190.

FIG. 2 is a schematic block diagram of a combinatorial solution determination system 190. The combinatorial solution determination system 190 selects an air conditioning system having minimum power consumption. The combinatorial solution determination system 190 includes, for example, one or more computers. When the combinatorial solution determination system 190 includes a plurality of computers, the plurality of computers may be connected to each other via a network.

The combinatorial solution determination system 190 mainly includes a candidate solution generation unit 110, a simulation unit 120, an evaluation index calculation unit 130, a solution determination unit 140, and a necessary-series-data extraction unit 150. The candidate solution generation unit 110 to the necessary-series-data extraction unit 150 are implemented by, for example, a CPU of a computer constituting the combinatorial solution determination system 190 executing a program stored in a storage device of the computer.

The candidate solution generation unit 110 generates candidate combinatorial solutions. A combinatorial solution is a solution determined by the combinatorial solution determination system 190. The combinatorial solution is information related to the configuration of the air conditioning system 100. Specifically, the combinatorial solution includes the air-conditioning selection parameters described above.

The simulation unit 120 calculates simulation data using information related to the candidate combinatorial solutions generated by the candidate solution generation unit 110 and series data for evaluating the combinatorial solution. The simulation data includes the power consumption of the air conditioning system 100, which is calculated by simulation using the candidate combinatorial solutions as input parameters. In the case of calculation of simulation data (power consumption) at a predetermined time, the series data is data related to the time. When the simulation unit 120 calculates the power consumption in a year by simulation, the series data is, for example, times of every hour in the year. In this case, the series data includes 8760 pieces of time data (365 days×24 hours/day). The power consumption calculated by the simulation unit 120 is the power consumption of the outdoor units 10a and 10b, the indoor units 20a to 20f, and the ventilators 30a and 30b. The power consumption of the ventilators 30a and 30b is calculated by ventilation simulation. The power consumption of the outdoor units 10a and 10b and the indoor units 20a to 20f is calculated by air conditioning simulation from the respective heat loads (sensible heat loads) in the zones 40a to 40c in consideration of the influence of the heat load by the ventilators 30a and 30b.

The evaluation index calculation unit 130 calculates evaluation indices based on the simulation data (power consumption) calculated by the simulation unit 120. An evaluation index is a parameter calculated from the total cost described above, an untreated heat load, an untreated amount of ventilation, and the like. The untreated heat load corresponds to a sensible heat load that cannot be handled when the sensible heat load that can be treated by the indoor units 20a to 20f arranged in the zones 40a to 40c is less than the sensible heat load applied to the zones 40a to 40c. The untreated amount of ventilation corresponds to a ventilation load that cannot be handled when the ventilation load that can be treated by the ventilators 30a and 30b arranged in the zones 40a to 40c is less than the ventilation load applied to the zones 40a to 40c. As the total cost, the untreated heat load, and the untreated amount of ventilation decrease, the evaluation index decreases. In terms of maximum utilization of resources, the smaller the evaluation index, the more preferable.

The solution determination unit 140 determines a combinatorial solution having high evaluation from among a plurality of candidate combinatorial solutions based on the evaluation indices each calculated by the evaluation index calculation unit 130 from a corresponding one of the plurality of candidate combinatorial solutions. A combinatorial solution having high evaluation is the combinatorial solution with the smallest evaluation index. The combinatorial solution determined by the solution determination unit 140 is an air-conditioning selection parameter that is optimum in terms of maximum utilization of resources.

The necessary-series-data extraction unit 150 acquires necessary series data. The necessary series data is data extracted from the series data. Specifically, as described above, when the series data includes 8760 pieces of time data indicating times of every hour, the necessary series data is time data corresponding to some of the 8760 pieces of time data (hereinafter referred to as "first series data").

After the necessary-series-data extraction unit 150 extracts the necessary series data, the simulation unit 120 calculates simulation data using the information related to the candidate combinatorial solutions and the necessary series data. Thus, the simulation unit 120 can calculate the simulation data (power consumption) based on a smaller number of pieces of time data than the pieces of time data included in the first series data. As a result, the combinatorial solution determination system 190 can reduce the computational cost required for calculating the power consumption.

Figure 3:
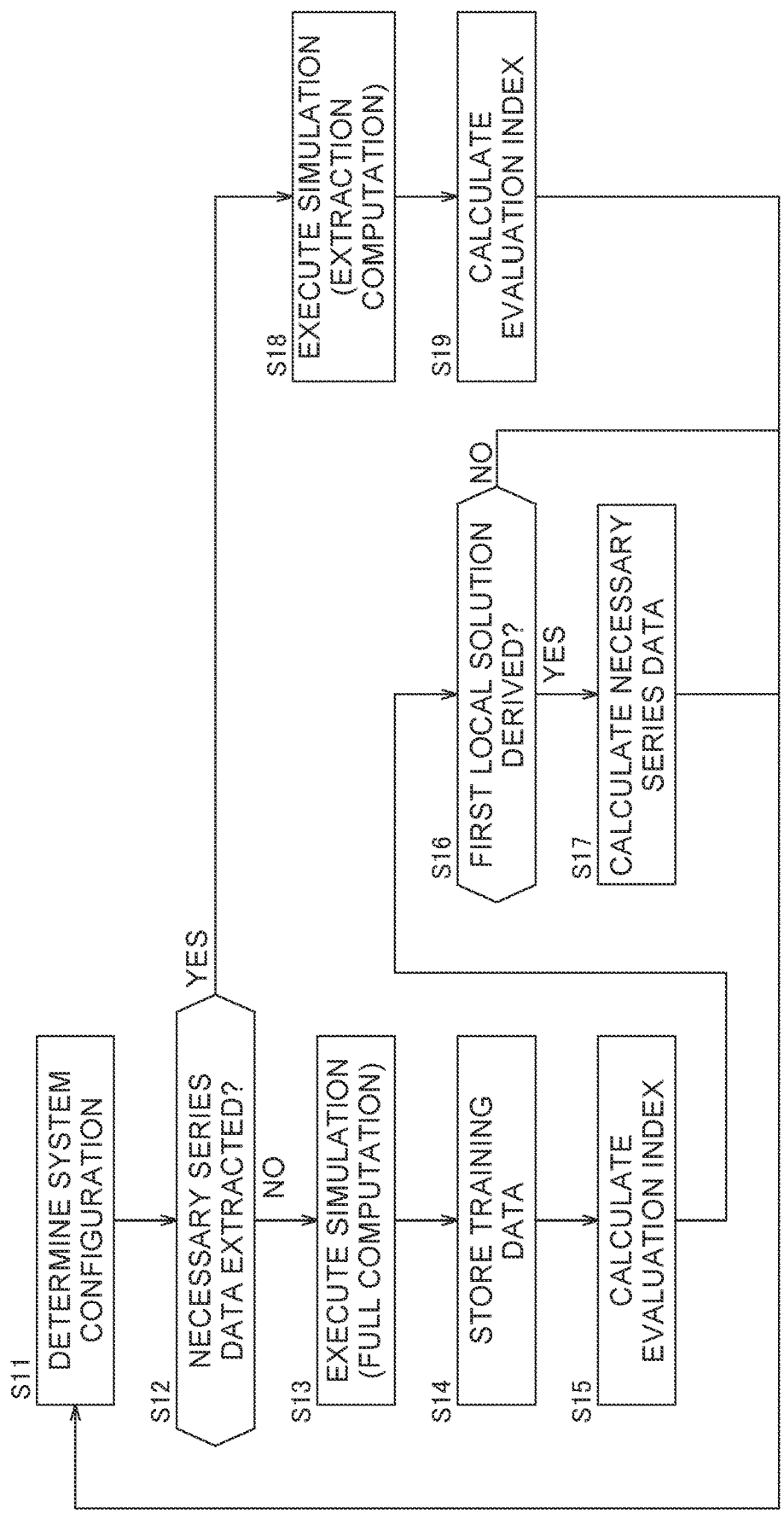
FIG. 3 is a flowchart of a process for selecting an air conditioning system, which is performed by the combinatorial solution determination system 190.

The reason that the combinatorial solution determination system 190 can reduce the computational cost will be described with reference to FIG. 3. FIG. 3 is a flowchart of a process for selecting an air conditioning system, which is performed by the combinatorial solution determination system 190.

In step S11, a system configuration is determined. Specifically, in step S11, the candidate solution generation unit 110 generates candidate combinatorial solutions.

In step S12, it is determined whether necessary series data has been extracted. If necessary series data has been extracted in step S16, the process proceeds to step S13. If no necessary series data has been extracted, the process proceeds to step S18.

In step S13, a simulation is executed. Specifically, the simulation unit 120 calculates simulation data at each of the times included in the first series data using the candidate combinatorial solutions and the first series data.

In step S14, simulation data (power consumption) at each time obtained in step S13 is stored as training data.

In step S15, an evaluation index is calculated by the evaluation index calculation unit 130 from the training data stored in step S14, and is stored.

In step S16, it is determined whether the first local solution has been derived based on the evaluation index calculated from the training data. The first local solution is calculated using the iterated local search method. The first local solution is, for example, a system configuration for which the evaluation index indicates the minimum value (local minimum value) for the first time after the start of execution of the simulation.

If the first local solution is derived in step S16, in step S17, necessary series data is extracted from the first series data based on the training data obtained so far. Specifically, the necessary-series-data extraction unit 150 extracts a time at which the power consumption is to be calculated. Then, a new system configuration is determined in step S11, and a simulation is executed.

If the first local solution is not derived in step S16, in step S11, anew system configuration is determined without extraction of necessary series data in step S17, and training data is further acquired.

In step S18, a simulation is executed based on the time (necessary series data) extracted in step S17. Specifically, the simulation unit 120 calculates simulation data at each of the times included in the necessary series data using the candidate combinatorial solutions and the necessary series data.

In step S19, an evaluation index is calculated by the evaluation index calculation unit 130 from the simulation data obtained in step S18, and is stored.

Then, a new system configuration is determined in step S11, a simulation is executed in step S18, and an evaluation index is calculated and stored in step S19. The process described above is performed for a predetermined number of candidate combinatorial solutions.

The simulation executed in step S13 (hereinafter referred to as "full computation") is performed using the first series data (8760 pieces of time data) including all the times. In contrast, the simulation executed in step S18 (hereinafter referred to as "extraction computation") is performed using the necessary series data (pieces of time data less than 8760) extracted from the first series data. The amount of computation time required for the extraction computation is shorter than the amount of computation time required for the full computation. Accordingly, the full computation is executed on each system configuration (candidate combinatorial solution) and training data is recorded until the first local solution is obtained, and, after the first local solution is obtained, the extraction computation is executed on each system configuration. As a result, an evaluation index can be efficiently obtained. Thus, executing a simulation (extraction computation) on a large number of system configurations can reduce the amount of computation time required for obtaining a system configuration (optimal solution) with a minimum evaluation index.

Next, an overview of a specific process for extracting the necessary series data from within the first series data in step S17 in FIG. 3 will be described.

The necessary-series-data extraction unit 150 extracts second series data from within the first series data based on the evaluation index using information related to, among n (n≥2) candidate combinatorial solutions generated by the candidate solution generation unit 110, m (m≥2 and n>m) candidate combinatorial solutions and the first series data. The second series data includes time data required to calculate an evaluation index with predetermined accuracy. In other words, the second series data includes time data having a large contribution to the simulation data (power consumption). The "m candidate combinatorial solutions" are information related to system configurations generated until the first local solution is obtained, and in other words are information related to system configurations used to generate training data.

Further, the necessary-series-data extraction unit 150 extracts, from within the first series data, third series data required for verifying the suitability of a predetermined constraint condition for the "m candidate combinatorial solutions" described above. The predetermined constraint condition is a condition related to an untreated heat load. The third series data includes, for example, time data for which the untreated heat load is likely to exceed a predetermined reference value. It is not preferable in terms of maximum utilization of resources that the untreated heat load is large even if the power consumption calculated by simulation is small. Accordingly, a value corresponding to the untreated heat load is added to the total cost as a penalty. Thus, an appropriate evaluation index can be calculated. Examples of the predetermined constraint condition include a condition that the untreated heat load is less than or equal to the predetermined reference value. In this case, the necessary-series-data extraction unit 150 extracts, as the third series data, first series data that is less likely to satisfy the predetermined constraint condition.

Then, the necessary-series-data extraction unit 150 combines the second series data and the third series data to acquire necessary series data. After the necessary-series-data extraction unit 150 extracts the necessary series data, the simulation unit 120 calculates simulation data using at least information related to the candidate combinatorial solutions other than the "m candidate combinatorial solutions" described above and series data including the necessary series data. The candidate combinatorial solutions other than the "m candidate combinatorial solutions" are information related to system configurations generated after the first local solution is obtained.

For example, the necessary-series-data extraction unit 150 extracts the second series data by sparse estimation, and extracts the third series data by extreme value statistics.

Sparse estimation is one of the regression coefficient estimation methods in regression analysis. Sparse estimation is a method for simultaneously performing estimation of regression coefficients and selection of variables to estimate an objective variable based on the values of as few explanatory variables as possible if the number of explanatory variables is large.

Extreme value statistics is a method in probability theory and statistics for estimating extreme values based on a continuous probability distribution model that represents how, among samples $X_1, X_2, \ldots,$ and $X_n$ having magnitudes n generated according to a certain cumulative distribution function, the number of samples that are greater than or equal to x (or less than or equal to x) is distributed.

(4) Specific Example of Combinatorial Solution Determination System (4-1) Overview Next, as a specific example, a combinatorial solution determination system for selecting an air conditioning system having minimum power consumption will be described in detail. This combinatorial solution determination system extracts times at which power consumption is to be computed using sparse estimation and extreme value statistics, and estimates the power consumption in a year from the extracted times to reduce the overall computational cost.

(4-2) Air Conditioner Configuration Problem

When indoor units are installed in a certain building, every indoor unit needs to be connected to an outdoor unit. While there is a limit on the number of indoor units that can be connected to one outdoor unit, a plurality of indoor units can be connected to one outdoor unit. A combination of an outdoor unit located in a building and indoor units connected to the outdoor unit is referred to as an air conditioning system.

When an air conditioner is installed in one building, there are various conceivable patterns. First, when an indoor unit is installed, because the indoor unit removes a sensible heat applied to each zone to maintain a comfortable temperature, the indoor unit needs to be capable of treating a sensible heat load equal to or more than the sensible heat load required in the zone. There are various conceivable combinations of indoor units, such as a pattern in which one indoor unit capable of treating a large sensible heat load is placed, and a pattern in which a plurality of indoor units of types capable of treating small sensible heat loads are arranged. A ventilator needs to satisfy the amount of ventilation required in one zone, and a sensible heat load required in each zone changes according to the use of the ventilator. Next, when an outdoor unit is arranged, there are also various conceivable patterns as to, first, which type of outdoor unit to use and, then, to which indoor unit in which zone to connect to form an air conditioning system.

The power consumption changes according to the air conditioning system to be used. A problem of deriving an air conditioning system having minimum power consumption is referred to as an air conditioner configuration problem. The present disclosure aims at minimizing the sum of a running cost obtained by converting power consumption into electricity rates for 15 years and the price of the air conditioner (initial cost).

(4-2-1) Constraints to be Taken into Account in Air Conditioner Configuration

Constraint conditions required for arranging an air conditioner will be described.

First, a load that can be treated by indoor units and a ventilator arranged in each zone needs to exceed a load required in the zone, and other conditions are that the number of indoor units that can be arranged in each zone does not exceed a certain upper limit and that the number of indoor units that can be connected to an outdoor unit also does not exceed a certain upper limit. Further, even if indoor units supporting a load equal or greater than a load required in a zone are arranged, there may be a time at which an untreated heat load is generated depending on the connection state of the indoor units and the like. Thus, a further condition is that the generated untreated sensible heat load is less than or equal to a specified value. The points to be taken into account described above are summarized below.

(A) The sensible heat load that can be treated by indoor units arranged in each zone is greater than or equal to a sensible heat load applied to the zone.

(B) The upper limit of the number of indoor units to be arranged in each zone is maintained.

(C) The upper limit of the number of indoor units that can be connected to an outdoor unit is maintained.

(D) The upper limit of the number of outdoor units to be installed is maintained.

(E) The amount of ventilation that can be treated by a ventilator arranged in each zone is greater than or equal to a ventilation load applied to the zone.

(F) The sensible heat load that has been generated in each zone and has failed to be treated is less than or equal to a specified value.

(4-2-2) Formulation as 0-1 Integer Programming Problem

The air conditioner configuration problem is formulated as a 0-1 integer programming problem.

The 0-1 integer programming problem is an optimization problem in which each variable takes a value of 0 or 1. Among the constraints (A) to (F) to betaken into account in the (4-2-1) section, the constraints (A), (E), and (F) are handled such that the conditions can be relaxed, and the amount of violation of the constraints is minimized by objective function.

(4-2-2-1) Description of Symbols

Symbols used for formulation will be described.

Constants

I: set of indoor units
O: set of outdoor units
Z: set of zones
V: set of ventilators
T={1, 2, ..., 8760}: set of times
$a_j$, $j \in I$: sensible heat load that can be treated by the indoor unit j
$b_i$, $i \in Z$: sensible heat load applied to the zone i
$f_i$, $i \in Z$: ventilation load applied to the zone i
$g_v$, $v \in V$: ventilation load that can be treated by the ventilator v
$p_j$, $j \in I$: price of the indoor unit j
$q_v$, $v \in V$: price of the ventilator v
c: upper limit of the number of indoor units to be arranged in a zone
d: upper limit of the number of indoor units that can be connected to an outdoor unit
e: upper limit of the number of outdoor units to be installed
M: reference value of untreated sensible heat Variables $x_{i,j,k}$, $i \in Z$, $j \in I$, $k \in O$: variables set to 1 when the indoor unit j is arranged in the zone i and connected to an outdoor unit of type k, or to 0 otherwise
$y_{i,v}$, $i \in Z$, $v \in V$: variables set to 1 when the ventilator v is arranged in the zone i, or to 0 otherwise
x: vector notation of $x_{i,j,k}$
y: vector notation of $y_{i,v}$
$\delta_k$, $i \in Z$: variables representing whether an outdoor unit of type k is installed (variables represented by Math. 1)

$$\delta_k = \begin{cases} 1 & \left(\sum_{i \in Z}\sum_{j \in I} x_{i,j,k} > 0\right) \\ 0 & \left(\sum_{i \in Z}\sum_{j \in I} x_{i,j,k} = 0\right) \end{cases} \quad \langle\text{Math. 1}\rangle$$

(4-2-2-2) Formulation

A formulation based on the constraints (A) to (D) in the (4-2-1) section using the symbols in the (4-2-2-1) section is given below.

$$\text{minimize} \quad C(f(x), h(y)) + \sum_{i \in Z}\sum_{v \in V} q_v y_{i,v} + \sum_{i \in Z}\sum_{j \in I}\sum_{k \in O} p_j x_{i,j,k} \quad \langle\text{Math. 2}\rangle$$

subject to $$\sum_{j \in I}\sum_{k \in O} x_{i,j,k} \le c, i \in Z \quad \sum_{i \in Z}\sum_{j \in I} x_{i,j,k} \le d, k \in O$$

$$\sum_{j \in I}\sum_{k \in O} a_j x_{i,j,k} \le b_i + g_i(y), i \in Z$$

$$\sum_{k \in O} \delta_k \le e \quad \sum_{v \in V} g_v y_{i,v} \le f_i, i \in Z \quad u_t(x) \le M, t \in T$$

The objective functions f(x) and h(y) are power consumption obtained as an output in response to an input of the variables $x_{i,j,k}$ and $y_{i,v}$ to the simulation software, and C(f(x), h(y)) is a function for calculating power rates from the power consumption.

In the constraint formula, g(y) is a load obtained as an output in response to an input of the variable $y_{i,v}$ to the simulation software.

In the constraint formula, $u_t(x)$ is an untreated sensible heat load at time t, which is obtained as an output in response to an input of the variable $x_{i,j,k}$ to the simulation software.

(4-2-3) Solution to Constrained Black-Box Optimization Problem

A constrained black-box optimization problem is typically transformed into an unconstrained optimization problem. Examples of the method for changing to an unconstrained optimization problem may include a method of removing an item not satisfying the constraint conditions during search from the search space, and a method using a penalty function method.

In this problem, the penalty function method is applied to the constraints (A), (E), and (F), and a violation of the constraints (B) to (D) is removed from the search space. The penalty function method is a method for unconstrained optimization of a penalty function defined by adding a penalty term for failure to satisfy a constraint condition to an objective function.

The penalty function F(x) is defined as follows.

$$F(x) = C(f(x), h(y)) + \sum_{i \in Z} \sum_{v \in V} q_v y_{i,v} + \sum_{i \in Z} \sum_{j \in I} \sum_{k \in O} p_j x_{i,j,k} + \rho \sum_{i \in Z} \max\left\{0, b_i + g_i(y) - \sum_{j \in I} \sum_{k \in O} a_j x_{i,j,k}\right\} + \max\left\{0, f_i - \sum_{v \in V} q_v y_{i,v}\right\} + \sum_{t \in T} \max\{0, u_t(x) - M\}$$ ⟨Math. 3⟩

ρ is a positive parameter.

(4-2-4) Solution to Black-Box Optimization Problem

This section introduces a solution to a black-box optimization problem and describes the policy of the solution discussed in the present disclosure. The problem is transformed into an unconstrained black-box optimization problem by using the method used in the (4-2-3) section, and an iterated local search method, which is known as a basic solution to a black-box optimization problem, is used for F(x) to improve the solution.

(4-3) Extraction of Computation Time

Figure 4:
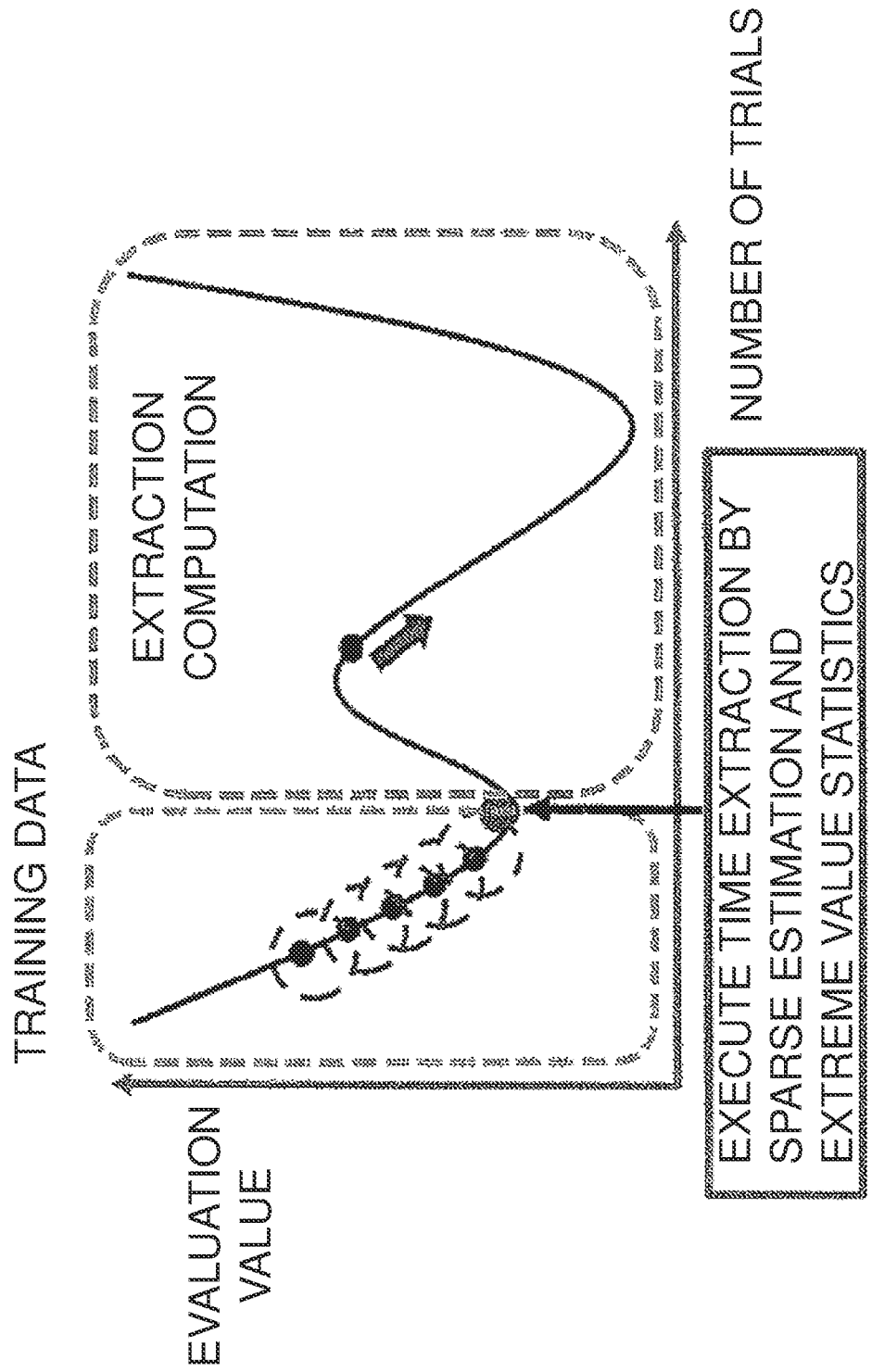
FIG. 4 is a graph illustrating time extraction in iterated local search.

To extract a computation time, training data indicating a data structure is required. In the air conditioner configuration problem, however, the simulation result varies depending on the type and location conditions of a building in which the air conditioner is arranged, climate, and so on, and thus it is difficult to create unique training data. In the present disclosure, accordingly, as illustrated in FIG. 4, computation is performed at all the times without execution of time extraction until the first local solution is derived in the iterated local search method, and data obtained until the first local solution is derived is used as training data to perform time extraction. In subsequent searches, computation is performed at extracted computation times to reduce the amount of computation time.

(4-3-1) Sparse Estimation

Sparse estimation has attracted attention in the last ten and several years from various fields such as informatics, machine learning, and statistics, and the present disclosure uses LASSO (Least Absolute Shrinkage and Selection Operator), which is a representative of the $L_1$ regularization method and was proposed by Tibshirani. LASSO is a method for estimating a parameter by minimizing a regularized loss function obtained by adding a regularization term based on the $L_1$ norm of the parameter to a loss function of a regression model, and is a method that stabilizes estimation and provides selection of variables. The following describes the theory of sparse estimation and a method for applying sparse estimation to the present disclosure.

(4-3-1-1) Theory of Sparse Estimation

It is assumed that, for an objective function Y and a p-dimensional explanatory variable $x=(x_1, \ldots, x_p)^T$ that take consecutive values, data $(x_i, y_i)$, where $i=1, \ldots, n$, is obtained by observation of n values. It is assumed that $x_i=(x_{i1}, \ldots, x_{ip})^T$ is satisfied. Normalization is performed so as to satisfy the following formulas.

$$\frac{1}{n}\sum_{i=1}^{n} y_i = 0, \frac{1}{n}\sum_{i=1}^{n} x_{ij} = 0, \frac{1}{n}\sum_{i=1}^{n} x_{ij}^2 = 0, (j = 1, \ldots, p)$$ ⟨Math. 4⟩

Assuming $X=(x_{(1)}, \ldots, x_{(p)})$, $x_i=(x_{i1}, \ldots, x_{nj})^T$, and $y=(y_1, \ldots, y_n)^T$, the regression model can be written as follows.

$$y = X\beta + \varepsilon$$ ⟨Math. 5⟩

As a method for estimating regression coefficients of a linear regression model, the following constrained minimization function, called lasso, is considered.

$$\min \frac{1}{2n}\|y - X\beta\|_2^2 \text{ subject to } \|\beta\|_1 \leq s$$ ⟨Math. 6⟩

Parameter estimation based on lasso provides a property in which the estimated values of several parameters are reduced to exactly 0. The solution obtained by the formula in Math. 6 has the same value as the solution obtained by minimizing a function given by the following expression, which is obtained by applying the method of Lagrangian undetermined multipliers to the formula in Math. 6, with respect to a parameter β.

$$\frac{1}{2n}\|y - X\beta\|_2^2 + \lambda\|\beta\|_1$$ ⟨Math. 7⟩

(4-3-1-2) Sparse Estimation in Present Disclosure

Assuming that the power consumption at time t in the i-th simulation computation is represented by $x_{it}$ (t=1, ..., 8760) and the total value of power consumption at all of the times is represented by $y_i$, a linear regression model can be written by the following formula.

$$y_i = \beta_1 x_{i1} + \ldots + \beta_{8760} x_{i8760}$$ ⟨Math. 8⟩

As a result of sparse estimation performed on this model, coefficients to be applied to many times among regression coefficients $(\beta_1, \ldots, \beta_{8760})$ are 0, and power consumption only at times for which the coefficients are not 0 is derived by the simulation software and is multiplied by the coefficients to estimate values of power consumption at all of the times.

(4-3-2) Extreme Value Statistics

This section describes extreme value statistics, which is used to extract a time at which an untreated load is likely to occur. Extreme value statistics is a study originally used in prediction or evaluation of natural disasters, and has been considered for the purpose of predicting, from observation data for a limited period of time, what event having a large value will occur in the future. To estimate an unobserved tail region, in extreme value statistics, it is considered that a distribution is applied only to data having large values. There are several statistical models for extreme value statistics, and a GEV model is used in the present disclosure. In the GEV model, a generalized extreme value distribution was applied to block maximum data in a certain period of time to perform analysis. The following introduces a GEV model and an analysis method thereof.

(4-3-2-1) Extreme Value Theory

First, consideration is given to random variables $X_1, X_2, \ldots$ that are independent and follow the same distribution F. The maximum values of n random variables are represented as follows.

$$Z_n = \max_{1 \le i \le n} X_i \qquad \text{<Math. 9>}$$

It is known that $Z_n$ converges to a non-degenerate distribution under the conditions that most continuous distributions satisfy when normalized by conversion to an appropriate scale.

(Fisher-Tippett Theorem)

If certain constants $a_n > 0$ and $b_n \in R$ and a non-degenerate distribution G are present and satisfy $$\lim_{n \to \infty} P\left(\frac{Z_n - b_n}{a_n} \le x\right) = G(x) \qquad \text{<Math. 10>}$$

then, the distribution G can be represented by a standard extreme value distribution $G_\xi$ expressed as follows.

$$G_\xi(x) = \exp\left[-(1 + \xi x)_+^{-\frac{1}{\xi}}\right] \qquad \text{<Math. 11>}$$

Definition

The following distribution is referred to as a generalized extreme value distribution and is represented by GEV($\mu$, $\sigma$, $\xi$)($-\infty < \mu < \infty$, $\sigma > 0$, $-\infty < \xi < \infty$).

$$G(z) = \exp\left[-\left(1 + \xi\left(\frac{z-\mu}{\sigma}\right)\right)_+^{-\frac{1}{\xi}}\right] G_\xi(x) = G_\xi\left(\frac{z-\mu}{\sigma}\right) \qquad \text{<Math. 12>}$$

The parameter ($\mu$, $\sigma$, $\xi$) of the generalized extreme value distribution GEV($\mu$, $\sigma$, $\xi$) is estimated by the maximum likelihood method by applying the generalized extreme value distribution to the block maximum data. Although the generalized extreme value distribution does not satisfy the regular condition regarding the maximum likelihood estimator, it is indicated that the maximum likelihood estimator is an asymptotically efficient estimator when $\xi > 0.5$ is satisfied. It is rare that $\xi \le 0.5$ is satisfied in terms of applications from experiments so far. Thus, parameter estimation is typically performed using the maximum likelihood method.

In the upper p probability point $z_p$ of the generalized extreme value distribution GEV($\mu$, $\sigma$, $\xi$) given by the formula below, the probability point $z_p$ is referred to as a reproduction level of a reproduction period 1/p.

$$G(z_p) = G_\xi\left(\frac{z-\mu}{\sigma}\right) 1 - p \qquad \text{<Math. 13>}$$

The reproduction level will be discussed here. The distribution G is defined as a generalized extreme value distribution GEV($\mu$, $\sigma$, $\xi$) that maximum data in a certain period of time (such as one year) follows. The maximum data in the period of time is assumed to be realized values of random variables $Z_1, Z_2, \ldots$ that are independent of each other and follow the same distribution G. At this time, considering the i-th period of time, since $Z_i$ is maximum in the period of time, the event $Z_i > z_p$ indicates that the maximum data exceeds the value $z_p$ and the event $Z_i \le z_p$ indicates that none of the pieces of observed data exceeds the value $z_p$. Consideration is given here to a binary random variable represented as follows.

$$B_i := I\{Z_i > z_p\} = \begin{cases} 1 & (Z_i > z_p) \\ 0 & (Z_i \le z_p) \end{cases} \qquad \text{<Math. 14>}$$

$B_1, B_2, \ldots$ are Bernoulli trials. Since $G(z_p) = 1-p$ is satisfied, $B_i$ are independent of each other and follow a binomial distribution $B(1, p)$. At this time, $$J_T = B_1 + B_2 + \ldots + B_T \qquad \text{<Math. 15>}$$

represents the number of years in which the maximum data $z_p$ in each year is exceeded among T years. From $J_T$ to B(T, p), the average $E(J_T) = Tp$ is satisfied. In particular, if $T = 1/p$ is set, then, $E(J_1/p) = 1$ is satisfied, and thus, a phenomenon that the reproduction level $z_p$ is exceeded is observed once for 1/p years on average.

(4-3-2-2) Extreme Value Statistics in Present Disclosure

A block in the present disclosure is set as data for which the untreated load is maximum among pieces of data at ten points found by the local search method, and an extreme value distribution is created for at each of the times. Based on the created extreme value distribution, a maximum value $z_{max}$ of an untreated load that is likely to occur at each time in the future is estimated. Here, the probability of exceeding z, in a period of time Y as a safer level period $z_p$ is suppressed by a small probability $\alpha$. That is, p satisfying the following formula is considered for sufficiently small $\alpha$, where $M_Y = \max\{Z_1, Z_2, \ldots, Z_Y\}$.

$$P(M_Y > z_p) = \alpha \Leftrightarrow P(M_Y \le z_p) = 1 - \alpha \qquad \text{<Math. 16>}$$

Here, p satisfying the following formula is computed for given $\alpha$.

$$P(M_Y \le z_p) = (1-p)^Y = 1 - \alpha \Rightarrow p(\alpha, Y) := p = 1 - (1-\alpha)^{1/Y} \qquad \text{<Math. 17>}$$

That is, to reduce the probability that the maximum data per year exceeds $z_p$ in the period of time Y to be less than or equal to $\alpha$, the upper $p = p(\alpha, Y)$ probability point $z_p$ of the generalized extreme value distribution G that the maximum data in the period of time follows is defined as a possible maximum value $z_{max}$. As a reference value M of the untreated sensible heat, computation for extracting a time at which $z_{max} > M$ is satisfied is performed, whereas a time at which $z_{max} < M$ is satisfied is eliminated.

(4-4) Problem Example (4-4-1) Basic Information

Basic information for air conditioner assignment is shown in Table 1, Table 2, Table 3, and Table 4 below.

Table 1 shows, from top to bottom, the number of zones, the number of types of indoor units, and the number of types of outdoor units.

Table 2 shows the ventilation load that can be treated by each type of ventilator.

Table 3 shows the sensible heat load capacity that can be treated by each type of indoor unit.

Table 4 shows the sensible heat load and the ventilation load applied to each zone.

TABLE 1

| | |
|---|---|
| Number of zones | 6 |
| Type of indoor unit | 25 |
| Type of outdoor unit | 4 |
| Type of ventilator | 18 |

TABLE 2

| Type of ventilator | Ventilation load that can be treated (CMH) | | | | | | | |
|---|---|---|---|---|---|---|---|---|
| Type A | 150 | 250 | 350 | 500 | 650 | 800 | 1000 | 1500 | 2000 |
| Type B | 150 | 250 | 350 | 500 | 650 | 800 | 1000 | | |
| Type C | | 250 | | 500 | | | | | |

TABLE 3

| Type of indoor unit | Sensible heat load that can be treated (kw) | | | | | | | | |
|---|---|---|---|---|---|---|---|---|---|
| Type A | | | 4.5 | 5.6 | 7.1 | 8 | 9 | 11.2 | 14 | 16 |
| Type B | 2.8 | 3.6 | 4.5 | 5.6 | 7.1 | 8 | 9 | 11.2 | 14 | 16 |
| Type C | | | 4.5 | 5.6 | 7.1 | | 9 | 11.2 | 14 | 16 |

TABLE 4

| | Zone A | Zone B | Zone C | Zone D | Zone E | Zone F |
|---|---|---|---|---|---|---|
| Sensible heat load (kw) | 7.7 | 8.2 | 2.4 | 9.7 | 5.5 | 12.7 |
| Ventilation load (CMH) | 250 | 250 | 250 | 250 | 250 | 250 |

(4-4-2) Constraint Conditions

The constraints described in the (4-2) section are given below.
(B) Up to two indoor units can be arranged in a zone.
(C) Up to six indoor units can be connected to one outdoor unit.
(D) The number of outdoor units to be installed is up to four.
(F) The specified value of an untreated sensible heat load is up to 5.5 kW.

In the present disclosure, the iterated local search method was used to derive the configuration of an air conditioner having the lowest power consumption, and, also, sparse estimation and extreme value statistics were used to attempt to reduce the amount of computation time. The computational environment is Intel® Core™ i7 CPU 2.5 GHz, and the memory is 8 GB.

Evaluation of the result of extraction computation by sparse estimation and extreme value statistics, and comparison between a configuration selected by a person in the related art and the optimal solution derived in the present disclosure were performed.

(4-5) Computational Experiment
(4-5-1) End Condition
The at-end condition in the iterated local search method was that the search was terminated when the number of iterations was 10000. Further, it was assumed that the number of neighbors to be searched at a time was 10 and the search was moved to the best solution among the 10 neighbors. If the solution was not improved even after 350 solutions were searched in the process of a simple iterated local search method, this solution was set as a local solution, and the process proceeded to the iterated local search step.

(4-5-2) Time Extraction

Solution computation was performed 1100 times until the first local solution was reached, and time extraction was performed by sparse estimation and extreme value statistics using data obtained through the 1100 computations as training data.

(4-5-2-1) Time Extraction by Sparse Estimation

Sparse estimation was performed to extract 27 variables out of 8760 variables for 24 hours and 365 days. The mae (mean absolute error) of power consumption estimation by sparse estimation was 31.23. The overall mae was small, and realized values and estimated values in all the obtained local solutions are as shown in Table 5 below. Further, it is considered that the evaluation values of the local solutions can be accurately estimated.

TABLE 5

| Estimated value (in thousand yens) | 6677.45 | 6690.08 | 6768.79 | 6455.74 | 6514.41 | 6549.81 | 6478.29 |
|---|---|---|---|---|---|---|---|
| Realized value (in thousand yens) | 6661.45 | 6682.79 | 6759.84 | 6440.43 | 6516.01 | 6568.47 | 6488.83 |

The correlation coefficient between the estimated value and the realized value was 0.9999867. This indicates that the relationship of the solutions remains almost unchanged, which can ensure that the local search using the estimated values can be performed.

(4-5-2-2) Time Extraction by Extreme Value Statistics

Figure 5:
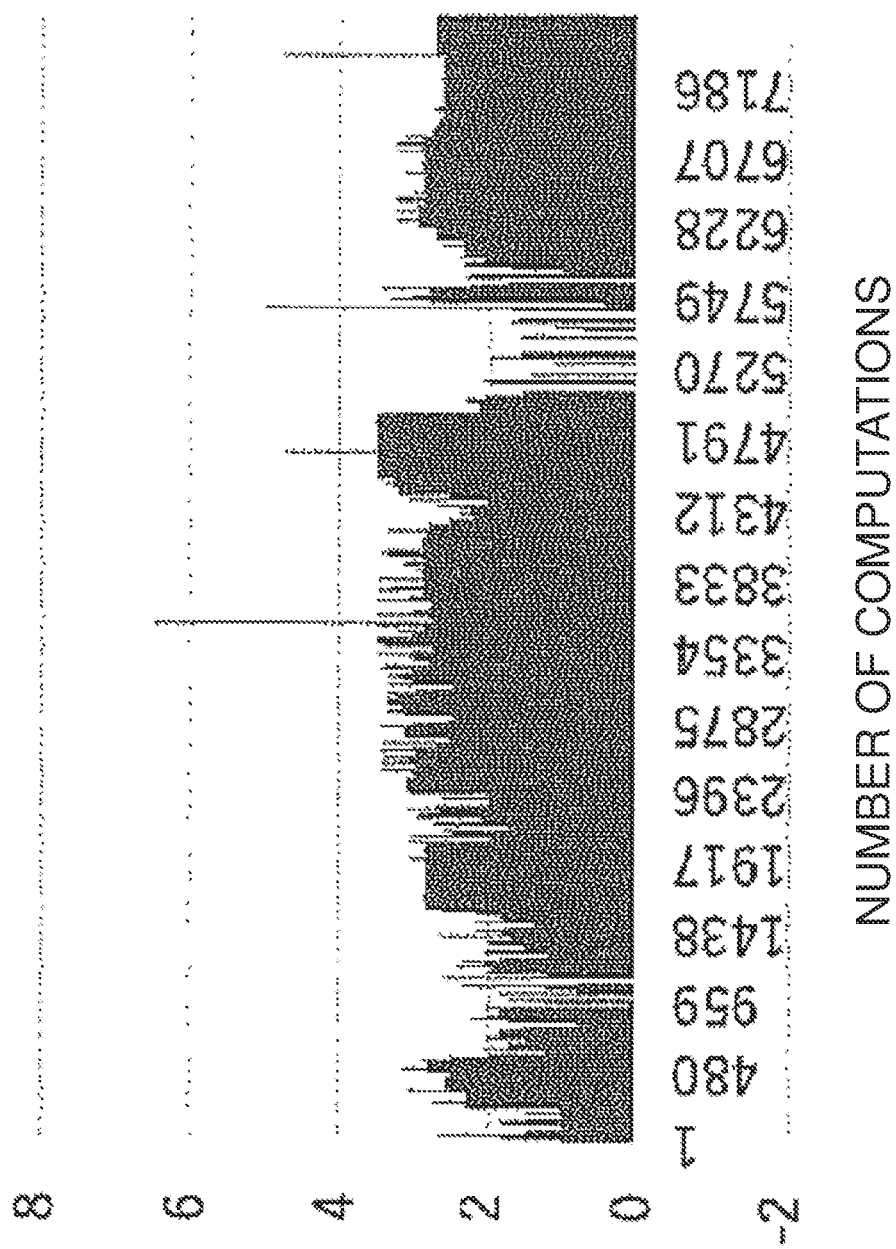
FIG. 5 is a graph illustrating untreated sensible heat at 10:00 on November 19.
Figure 6:
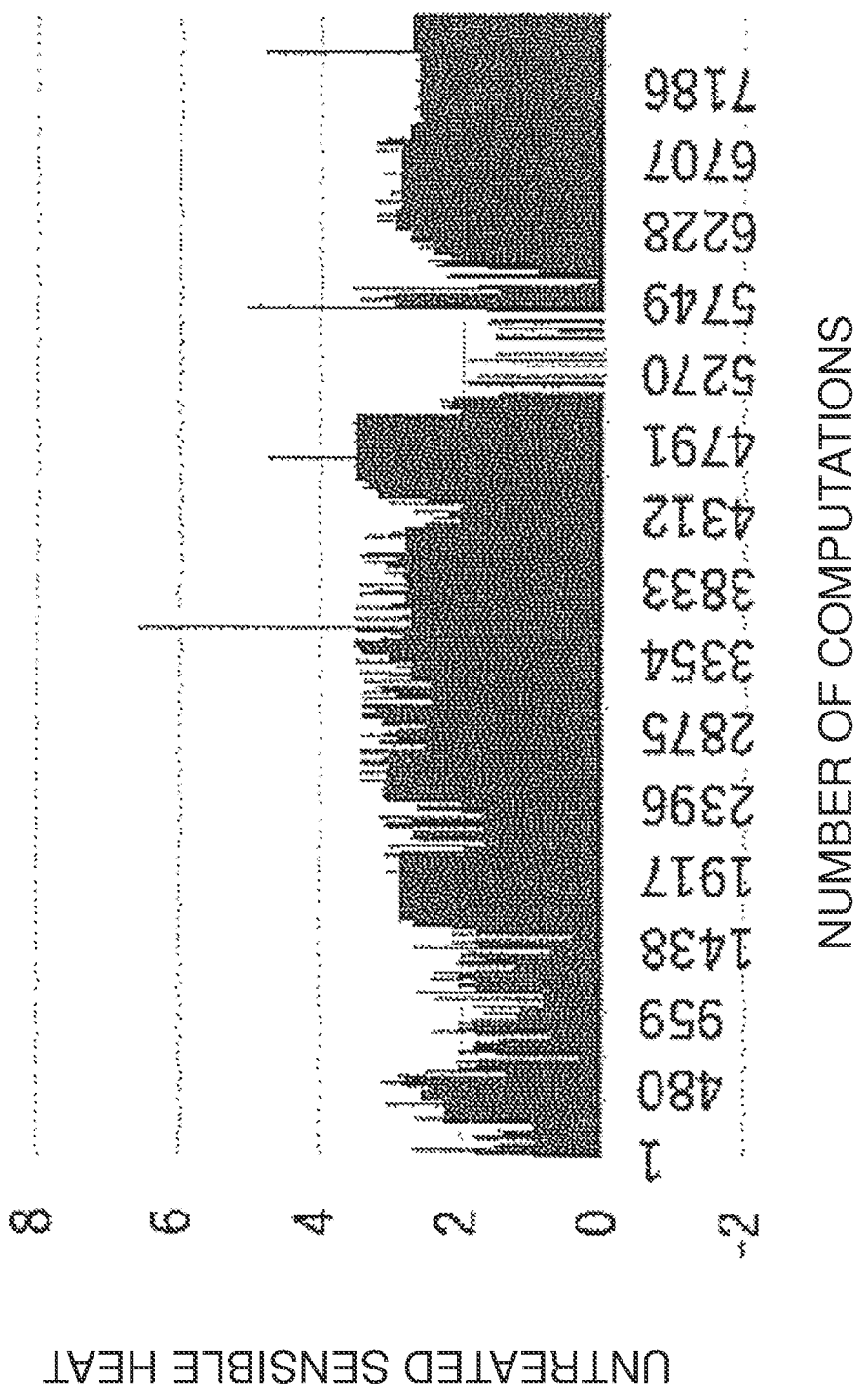
FIG. 6 is a graph illustrating untreated sensible heat at 11:00 on November 19.
Figure 7:
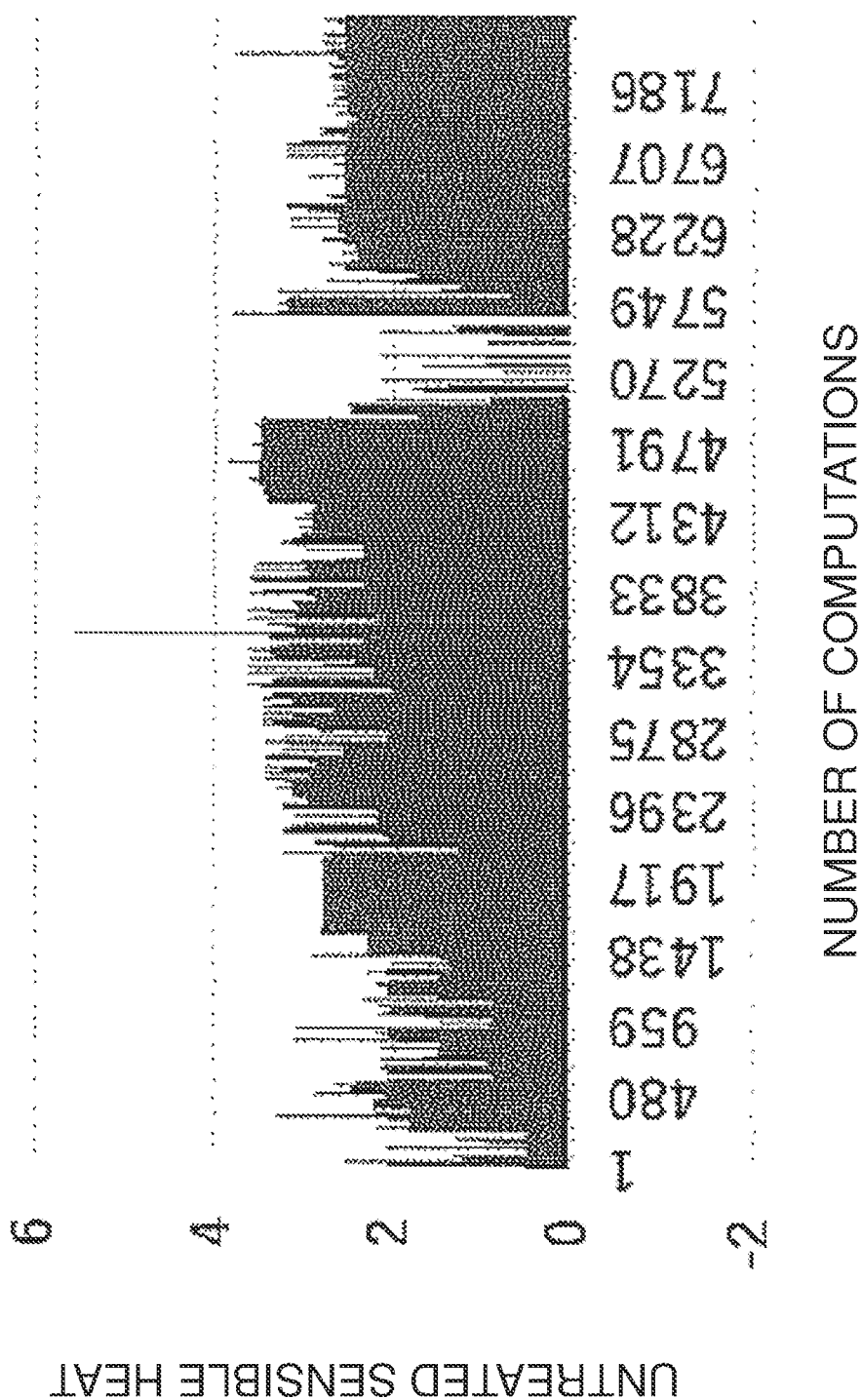
FIG. 7 is a graph illustrating untreated sensible heat at 12:00 on November 19.
Figure 8:
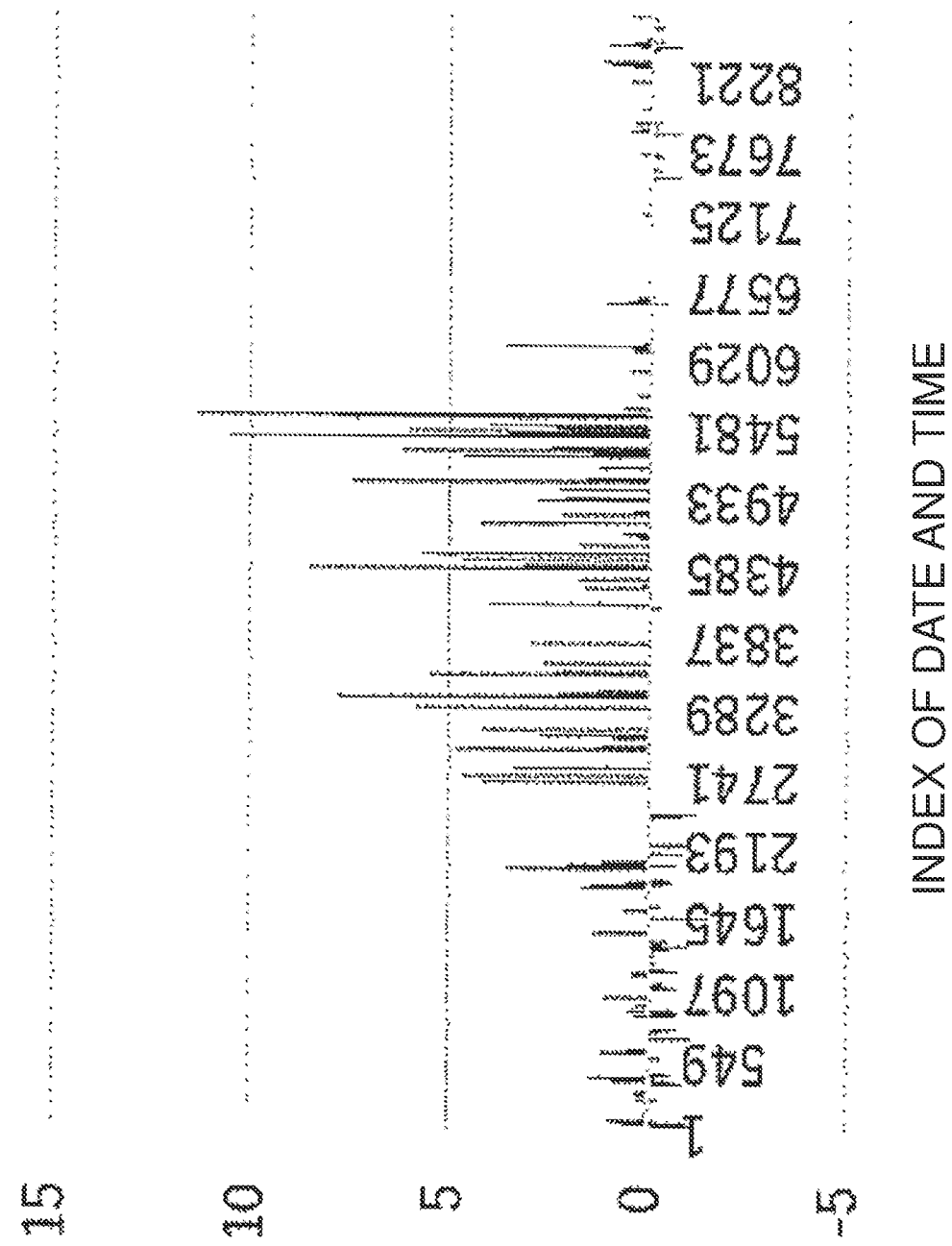
FIG. 8 is a graph illustrating untreated sensible heat in a configuration obtained as a result of the 3642nd computation.

The reference value M in time extraction by extreme value statistics was 4 kW, which was lower than the original reference value (5.5 kW), to act on the safe side. In the present disclosure, 10000 computations were performed, and the maximum value of the results of ten computations was used in extreme value statistics. Thus, Y=1000 and α=0.05 were set. The upper $p(0.05, 1000)=5.13\times10^{-5}$ probability points z, of the generalized extreme value distribution G was computed to compute the value $z_{max}$, which could occur with a probability of percent in the computation process. As a result, a time at which $z_{max} \geq 4$ was satisfied was extracted. While the reference value is lowered to the safe side, there were three times <10:00:00 on November 19, 11:00:00 on November 19, 12:00:00 on November 19> that could not be included in the extraction based on extreme value statistics at the date and time when the original reference value, or 5.5 kW, was exceeded. Transitions of an untreated sensible heat in the entire search process at the three times are illustrated in FIGS. 5 to 7. It can be seen from FIGS. 5 to 7 that a reference value of 5.5 was exceeded in the 3642nd computation. FIG. 8 illustrates the untreated sensible heat at all of the times for the air conditioner configuration found in the 3642nd computation.

It can be seen from FIG. 8 that, as a result of checking the untreated sensible heat in each configuration, there is a time at which an untreated sensible heat that greatly exceeds the reference value is generated in all the configurations, an untreated sensible heat that exceeds the reference value at a time not selected in extreme value statistics appears only for a special configuration, and an untreated sensible heat generated when a local solution is approached can be covered by extraction by extreme value statistics.

(4-5-2-3) Optimal Solution and Amount of Computation Time

The evaluation values for the optimum configuration derived in the present disclosure and a configuration selected by a person in the related art are shown in Table 6 below.

TABLE 6

|  | Total cost (in thousand yens) | Device cost (in thousand yens) | Electricity cost (in thousand yens) | Penalty |
|---|---|---|---|---|
| Design A | 9283.1 | 1840.0 | 7443.1 | 765.2 |
| Design B | 7293.3 | 1510.9 | 5782.4 | 115.7 |
| Design C | 7354.1 | 1576.1 | 5778.0 | 0 |
| Optimal design | 6417.6 | 1569.4 | 4848.2 | 0 |

As can be seen from Table 6, the result of the total cost derived for the optimal design is better than that for any of the existing designs, and the value of the penalty for the optimal design can be 0.

A comparison in the amount of computation time is shown in Table 7 below.

TABLE 7

|  | Amount of computation time (hour) | Reduction rate |
|---|---|---|
| Full computation | 13.37 |  |
| Extraction computation | 3.62 | 72.92 |

The amount of computation time can be reduced by 73% as compared with full computation.

(4-6) Conclusion

The air conditioner configuration problem is a black-box optimization problem in which an objective function and a constraint condition are determined by simulation, and is difficult to formulate. In the present disclosure, accordingly, optimization is performed using an iterated local search method. With the use of the iterated local search method, it is possible to derive a configuration whose cost is lowered than that of the related art. However, there is an issue in that the computational cost is high because of the use of simulation software, and a simple iterated local search method takes an enormous amount of time.

In the present disclosure, accordingly, data obtained until the method falls into a local solution for the first time is used as training data, and sparse estimation is used to estimate an objective function value from some dates and times. Thus, the number of times at which computation is to be performed can be reduced from 8760 variables to 27 variables, and estimation with very high accuracy, such as a mac of 31.23 and a correlation coefficient of 0.9999867, can be performed. However, only with time extraction by sparse estimation, no consideration is placed on the constraint condition, and an untreated sensible heat may be generated at a time that has not been extracted. Accordingly, extraction of times at which the constraint condition can be violated based on extreme value statistics is performed to extract variables that can violate the constraint condition. The times extracted by sparse estimation are also added such that no overlap occurs to obtain 172 variables, and extraction computation is performed using the 172 variables. As a result, the amount of computation time can be reduced by 73%. Further, it is possible to derive a design whose cost is lowered than existing designs in terms of the value of the objective function, and obtain a result comparable to that obtained when full computation is performed.

(5) Advantages

The combinatorial solution determination system 190 can reduce the computational cost required for simulation. Accordingly, the combinatorial solution determination system 190 can reduce the amount of computation time and efficiently derive the solution of a black-box optimization problem.

(6) Modifications (6-1) Modification A

The necessary-series-data extraction unit 150 may eliminate data unnecessary for calculating the evaluation indices with predetermined accuracy from the first series data to acquire the second series data.

The necessary-series-data extraction unit 150 may eliminate data unnecessary when a predetermined constraint condition is taken into account from the first series data to acquire the third series data.

(6-2) Modification B

The combinatorial solution determined by the combinatorial solution determination system 190 is a combinatorial solution for a product or a combinatorial solution for a method. In the embodiment, the combinatorial solution may be a combinatorial solution for a method such as air conditioning control parameters and details of air conditioning control.

The combinatorial solution determination system 190 may also be used in a system other than an air conditioning system. For example, the combinatorial solution determination system 190 can be used in a plant design system. In this case, the combinatorial solution determination system 190 may be used to determine the optimal capacity of each device of a plant to minimize the operating cost of the plant or to determine the optimal operating method of each device.

(6-3) Modification C

The combinatorial solution determined by the combinatorial solution determination system 190 may improve environmental conditions of an application target of the combinatorial solution. In the embodiment, the application target of the combinatorial solution is a space to be air conditioned. The first series data is previous data that is related to the environmental conditions of the application target of the combinatorial solution and that affects improvement of the environmental conditions. The environmental conditions are, for example, the temperature, humidity, and carbon dioxide concentration of the space to be air conditioned. The previous data is, for example, a heat load and a ventilation load.

(6-4) Modification D

The necessary-series-data extraction unit 150 extracts the second series data by sparse estimation. However, the necessary-series-data extraction unit 150 may use a method other than sparse estimation to extract the second series data. Examples of the other method include a multiple regression analysis, a principal component analysis, a discriminant analysis, and a random forest.

(6-5) Modification E

The necessary-series-data extraction unit 150 extracts the third series data by extreme value statistics. However, the necessary-series-data extraction unit 150 may use a method other than extreme value statistics to extract the third series data. An example of the other method is a method for extracting a condition exceeding a predetermined value with a certain frequency. Another example of the other method is a method for applying generated values to a normal distribution to calculate an average and a variance, and extracting a condition exceeding a predetermined value with a certain probability.

—Note—

While an embodiment of the present disclosure has been described, it will be understood that forms and details can be changed in various ways without departing from the spirit and scope of the present disclosure as recited in the claims.

INDUSTRIAL APPLICABILITY

A combinatorial solution determination system can efficiently derive a solution of a black-box optimization problem.

REFERENCE SIGNS LIST

110 candidate solution generation unit
120 simulation unit
130 evaluation index calculation unit
140 solution determination unit
150 necessary-series-data extraction unit
190 combinatorial solution determination system

CITATION LIST

Patent Literature

PTL 1: Japanese Unexamined Patent Application Publication No. 2006-48475

What is claimed is:

1. A combinatorial solution determination system comprising:
   a computer having a memory and a CPU, the computer including a candidate solution generation unit, a simulation unit, an evaluation index calculation unit, a solution determination unit and a necessary-series-data extraction unit,
   the candidate solution generation unit being configured to generate candidate combinatorial solutions;
   the simulation unit being configured to calculate
      simulation data using information related to the candidate combinatorial solutions generated by the candidate solution generation unit, and
      series data to evaluate a combinatorial solution;
   the evaluation index calculation unit being configured to calculate evaluation indices based on the simulation data;
   the solution determination unit being configured to determine a combinatorial solution having high evaluation from the plurality of candidate combinatorial solutions based on the evaluation indices each calculated by the evaluation index calculation unit from a corresponding one of the plurality of candidate combinatorial solutions; and
   the necessary-series-data extraction unit being configured to extract, based on the evaluation indices calculated by the evaluation index calculation unit from information related to m candidate combinatorial solutions of n candidate combinatorial solutions generated by the candidate solution generation unit, and first series data used as the series data, second series data from within the first series data, the second series data being series data required to calculate the evaluation indices with predetermined accuracy, m being ≥2, and n being ≥2,
      extract, from within the first series data, third series data required to verify suitability of a predetermined constraint condition for the m candidate combinatorial solutions, and
      combine the second series data and the third series data and acquire the second series data and the third series data as necessary series data,
   after the necessary-series-data extraction unit extracts the necessary series data, the simulation unit being configured to calculate the simulation data using at least information related to a candidate combinatorial solution other than the m candidate combinatorial solutions of the n candidate combinatorial solutions, and series data including the necessary series data,
   the combinatorial solution being configured to improve an environmental condition of an application target of the combinatorial solution, and
   the first series data being previous data that is related to the environmental condition of the application target of the combinatorial solution and that affects improvement of the environmental condition.

2. The combinatorial solution determination system according to claim 1, wherein
   the third series data is less likely to satisfy the predetermined constraint condition than the first series data that is not the third series data.

3. The combinatorial solution determination system according to claim 2, wherein
   the necessary-series-data extraction unit is configured to extract the second series data by sparse estimation, and to extract the third series data by extreme value statistics.

4. The combinatorial solution determination system according to claim 2, wherein
   the necessary-series-data extraction unit is configured to eliminate data unnecessary to calculate the evaluation indices with the predetermined accuracy, and data unnecessary when the predetermined constraint condition is taken into account, from the first series data to acquire the necessary series data.

5. The combinatorial solution determination system according to claim 2, wherein
   the combinatorial solution is a combinatorial solution for a product or a combinatorial solution for a method.

6. The combinatorial solution determination system according to claim 1, wherein
   the necessary-series-data extraction unit is configured to extract the second series data by sparse estimation, and to extract the third series data by extreme value statistics.

7. The combinatorial solution determination system according to claim 6, wherein
   the necessary-series-data extraction unit is configured to eliminate data unnecessary to calculate the evaluation indices with the predetermined accuracy, and data unnecessary when the predetermined constraint condition is taken into account, from the first series data to acquire the necessary series data.

8. The combinatorial solution determination system according to claim 6, wherein
   the combinatorial solution is a combinatorial solution for a product or a combinatorial solution for a method.

9. The combinatorial solution determination system according to claim 1, wherein
the necessary-series-data extraction unit is configured to eliminate data unnecessary to calculate the evaluation indices with the predetermined accuracy, and data unnecessary when the predetermined constraint condition is taken into account, from the first series data to acquire the necessary series data.

10. The combinatorial solution determination system according to claim 9, wherein
the combinatorial solution is a combinatorial solution for a product or a combinatorial solution for a method.

11. The combinatorial solution determination system according to claim 1, wherein
the combinatorial solution is a combinatorial solution for a product or a combinatorial solution for a method.

\* \* \* \* \*